Aug. 9, 1932.                 P. J. MARCHAUT                   1,870,370
          AUTOMATICALLY SUPPLIED MOLD WITH CONTROLLED
             RELEASE FOR THE PRODUCTION OF ICE BLOCKS
                          Filed Jan. 8, 1931
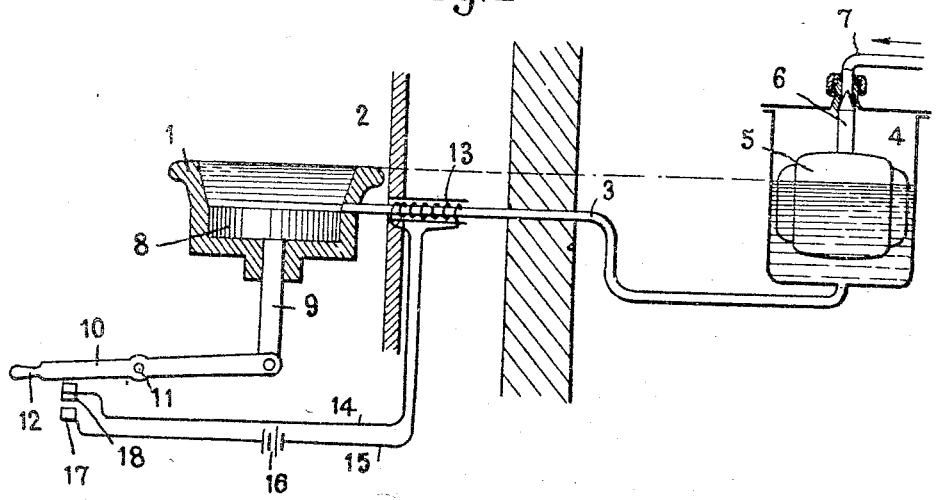
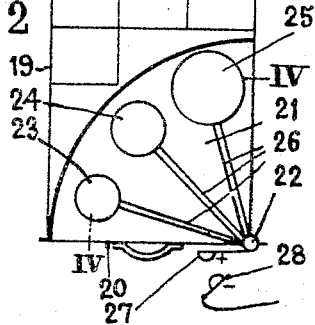
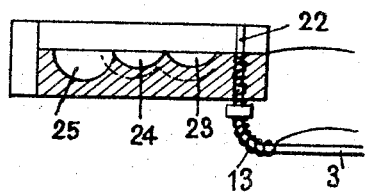
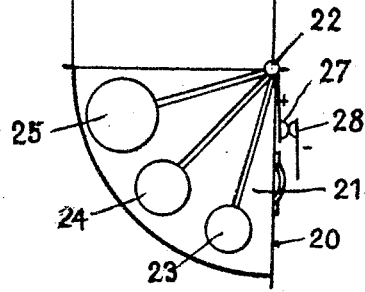
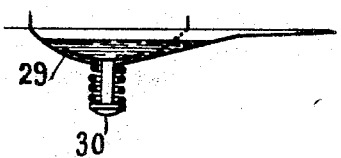
Inventor
Pierre Jean Marchaut
per /s/ Attorney Patented Aug. 9, 1932

1,870,370

UNITED STATES PATENT OFFICE

PIERRE JEAN MARCHAUT, OF ENGHIEN, FRANCE

AUTOMATICALLY SUPPLIED MOLD WITH CONTROLLED RELEASE FOR THE PRODUCTION OF ICE BLOCKS

Application filed January 8, 1931, Serial No. 507,406, and in France November 29, 1930.

This invention has for its object an automatically supplied mold with controlled release, for the production of ice blocks.

It has already been proposed in ice machines and more particularly for household machines or those of limited output, to produce blocks or molds of ice of sufficiently small size to permit their immediate use without it being necessary to submit them to further manipulation (breaking up). Nevertheless, the arrangements hitherto known of this character present the inconvenience of not allowing easy removal from the molds, so that the user is compelled to resort to tiresome operations to effect this removal, and has a difficulty in opening the drawer (being then obliged to treat it with a jet of warm water, it being difficult to extract from the drawer more than a part of the ice blocks), so that these arrangements do not fulfill their object.

The mold according to the invention which overcomes these difficulties comprises an arrangement for the constant-level supply of the water or other substance to be frozen, and has a single or multiple cavity capable of being if necessary provided with a movable base constituting a kind of piston and having a control projecting or otherwise outside the machine in order that an elevating movement may be communicated thereto to drive out the blocks thus produced, an electric heating arrangement or the like being suitably connected to the said control to permit the thawing of the supply tube of liquid in the part adjacent to the refrigerant and which may have been frozen.

In the annexed drawing which represents diagrammatically as examples methods of executing the mold according to the invention:

Fig. 1 is a diagrammatic general view of a first form of execution,

Fig. 2 shows an ordinary refrigerator drawer provided with another form of execution of the invention, Fig. 3 shows the drawer of Fig. 2 in the position for the extraction of the molds, Fig. 4 is a diagrammatic section on IV—IV of Fig. 2, Figs. 5 and 6 show variations in arrangements for disengaging the frozen blocks.

In Fig. 1, the mold 1 of suitable shape and opened out to permit easy extraction, fitted inside the refrigerating chamber 2 of an ice machine of any suitable arrangement, is connected by a tube 3 to a constant-level supply reservoir 4. This reservoir comprises, for example, in its interior a float 5 provided with a blocking needle 6 intended to block a conduit 7 for the supply of water or other liquid when this liquid reaches, in the reservoir 4, a predetermined level corresponding, for example, to the upper edge of the mold 1.

The bottom of the mold is formed by a piston 8 provided with a manipulating rod 9 passing through a tight joint in the bottom of the mold 1 and connected at its lower extremity to a working lever 10 hinged at a fixed point 11 and provided with an operating handle 12 situated at a suitable point inside or outside the machine.

At a suitable point of the pipe 3, close to the refrigerating chamber 2, there is fitted, on this tube, a heating resistance 13, connected by conductors 14—15, to a source of electricity 16, as also to a group of two contacts, one fixed 17, and the other movable, 18, placed in the path of the lever 10.

The operation is as follows:

The parts occupying the position shown on the drawing the float 5 permits the supply into the reservoir 4 and into the mold 1 of the water or other liquid to be frozen coming from a source of supply not shown, until the level of this liquid inside the mold 1 reaches approximately the upper edge of the mold. At this moment, the needle 6 cut off the supply of liquid through the duct 7; the mold 1 being filled with liquid as shown in Fig. 1, the liquid contained in the mold 1 is frozen to form a block or lozenge of ice. When it is desired to extract the block or lozenge thus formed, the handle 12 of the lever 10 is depressed, thus causing the piston 8 to rise and force out the block, lozenge or mold thus formed. This expulsion of the said block is facilitated by the opened out arrangement of the walls of the mold 1, any adhesion of this block to the surfaces of the mold being easily overcome by the force exerted on the lever 10.

During the action of the lever 10, this bears on the movable contact 18 to force it on to the contact 17, thus closing the circuit through the heating resistance 13 which operates and effects the liquefaction of the water which may have been frozen in the section of the pipe 3 situated inside the freezing chamber 2 or passing through the wall of this chamber. Due to this arrangement, when the piston 8 has been brought back into the position shown on the drawing, the water or other liquid can again flow into the mold 1 and fill it in preparation for the formation of a fresh block of ice.

The piston 8 may or may not be tightly sealed in its fitment in the mold 1 when it occupies its lower position shown in the drawing. Should this piston adhere too strongly to the mold 1 by reason of the freezing of the water or other liquid, which may have penetrated between it and the surface of the mold, a suitable heating arrangement might be arranged on the periphery of this piston 8 or close to the inner surface of the mold 1, the operation of which would be controlled by a contact arranged for example on the lever 10 and which would be brought into the closed position before the operation of the lever 10, to do away with or reduce the adhesion of the piston 8 to the surface of the mold 1.

Instead of effecting the expulsion of the blocks or molds of ice by the piston 8, it would be possible to effect a turning over or oscillation of the mold 1 by means of a suitable control, this control being thus connected with the heating device. To facilitate the extraction of the blocks or molds of ice in the inverted position of the mold 1, should there be produced an adhesion between the surface of the mold and the ice sufficient to prevent the fall of the blocks of ice, it would be possible to fit a heating resistance embedded in the inner surface of the mold 1 to ensure the release of the blocks of ice. During this rotation or inversion of the mold 1, the blocking of the pipe 3 supplying water or other liquid might be effected by the outer surface of the mold 1 itself, or by a cock suitably fitted in its pipe and manipulated by the device controlling the manipulation of the mold.

It would be also possible to effect the withdrawal from the mold by a lateral thrust of the blocks of ice with or without a heating device.

The mold 1 could naturally comprise one or any desired number of compartments of suitable dimensions and having any desired shape. This mold could be constituted by a series of dishes stamped in a plate in the form of a sector rotating on a plate which would constitute the surface of the refrigerating chamber. Naturally, each of the elements of the mold could have a separate and independent control, thus permitting the withdrawal from the interior of the refrigerating chamber 2 of simply the desired quantity of ice.

Figs. 2 to 6 show an adaptation to a refrigerator of usual design: There is fitted in the drawer 19 of this refrigerator near the front wall 20 of this drawer, a rotating sector 21 pivoting about a hollow hinge 22 forming a cock, to which is connected the pipe 3 of the water supply. This sector has a stamped bottom in which are formed cavities such as 23, 24, 25, of, if necessary, different dimensions, to which the water to be frozen is supplied by the ducts shown at 26. The operation of the heating resistance 13 is effected through the contacts 27, 28, which are brought into contact during the opening of the sector 21 by pivoting about its axis 22.

The withdrawal of the blocks formed in the cavities 23 to 25, may be effected either by hand or as shown in Fig. 5, by a movable bottom 29 provided with a spring driver 30, or as in Fig. 6, by means of a rod 31 provided with a spur 32 intended to be thrust into the ice.

The invention is applicable to so-called household refrigerators for obtaining blocks of ice of small dimensions, and of any desired shape. It is also applicable in all cases where it is desired to obtain ice in any quantity in the form of blocks, lumps or other solids of any desired dimension, whatever may be the number of the molds.

What I claim is:

1. An ice making machine, including the combination with a constant level water tank of a mold automatically supplied by said tank, a movable bottom of said mold, and means for simultaneously actuating said movable bottom and for supplying heat to the water supply adjacent to said mold.

2. An ice making machine including, in combination, a water supply tank, an ice mold having automatically sloping walls, means for supplying water at a constant level from said tank to said mold, a movable bottom to said mold, a rod connected to said movable bottom, a lever connected to said rod, a heating resistance surrounding the water supply pipe to the mold and electric contacts arranged to be closed by movement of said lever to actuate said movable bottom.

3. An ice making machine including, in combination, a constant level water tank, a mold automatically supplied by said tank, said mold being in the form of a sector mounted on a hollow pivot forming a stop cock for the water to be frozen and having depressions at suitable points and means for extracting the ice blocks formed.

In testimony whereof I have hereunto set my hand at Paris, this 23rd day of December, 1930.

PIERRE JEAN MARCHAUT.